UNITED STATES PATENT OFFICE.

HERMAN C. MEISTER, OF ST. LOUIS, MISSOURI.

PROCESS OF EXTRACTING ZINC FROM ZINC-SKIMMINGS.

SPECIFICATION forming part of Letters Patent No. 714,502, dated November 25, 1902.

Application filed August 16, 1902. Serial No. 119,834. (No specimens.)

*To all whom it may concern:*

Be it known that I, HERMAN C. MEISTER, a citizen of the United States, residing at St. Louis, in the State of Missouri, have invented a new and useful Improvement in Processes of Extracting Zinc from Zinc-Skimmings, of which the following is a specification.

My invention relates to a process of extracting zinc from the substance technically known as "zinc-skimmings," which is produced in large quantities in the process of galvanizing iron in its various forms. The substance is composed ordinarily of oxid of zinc, chlorid of zinc, oxychlorid of zinc, chlorid of ammonia, and miscellaneous foreign substances, all in varying proportions, and various processes of extracting the zinc have heretofore been employed to a considerable extent. All processes that have, so far as I am aware, been practiced heretofore, however, present difficulties and objections. The processes employed have been by no means satisfactory in the amount of zinc recovered, a considerable percentage being lost in the way of fumes or wash, according to the method of treatment. The fumes referred to consist of chlorid of ammonia and chlorid of zinc, both of which are noxious in a high degree and not only are a nuisance to the neighborhood, but are highly injurious to the comfort and health of the workmen. It is obvious that a loss of zinc must result wherever there is a volatilization in the form of chlorid of zinc, and the quantity of the chlorid of zinc is increased by the presence of the chlorid of ammonia.

The object of my invention is to recover the highest possible percentage of zinc from the zinc-skimmings in an economical manner on a commercial scale and without the production of the fumes of chlorid of zinc or any other fumes of an injurious nature in any considerable quantity.

My process consists in converting substantially all the zinc present in the form of chlorid of zinc into oxid of zinc, so that either after separation from the remaining substances or in association with them it may be further treated by the ordinary process of distillation for the recovery of the zinc. To this end I treat the zinc-skimmings with the oxid of an alkali or of an alkaline earth, preferably oxid of calcium or common lime, in the presence of moisture.

Confining my description to the employment of lime, which is the most advantageous to use under all ordinary conditions, I preferably mix it preliminarily with the zinc-skimmings by grinding them together in the proportion of approximately one part of lime to from two to five parts of the skimmings, depending upon the relative quantity of chlorids in the latter, which is a matter which can be readily determined by test or analysis, the general rule being that the larger the amount of chlorids present the greater the quantity of lime to be used. This rule as to proportion applies also to the other oxids of alkalies and alkaline earths. However, it should be understood that an excess of the treating substance in no manner affects the process, but bears only upon the question of economy. In the more or less finely-divided condition referred to the mixture of skimmings and lime is thrown into a tank of water, whereupon the chemical reactions sought take place, and these are facilitated by heating or boiling the water, though heat beyond the heat of the chemical action itself is not absolutely essential. The material chemical reactions which take place are the following: The zinc of the chlorid of zinc and oxychlorid of zinc parts with its chlorin and takes up oxygen from the added treating substance, while the base of the latter takes up the liberated chlorin, forming a chlorid of the base, which in the case of lime is chlorid of calcium. The resulting mass is oxid of zinc, which is insoluble in association with the chlorid of the base of the treating substance, and the latter may be removed, if desired, by drawing off the aqueous solution, the oxid of zinc remaining behind as a sediment. Minor chemical reactions take place—for instance, the production of ammonia and chlorid of calcium from the chlorid of ammonia present and the lime, both of which are soluble in water and which may be saved, if desired, from the aqueous solution which is drawn off. It is obvious that in order to permit the separation of the oxid of zinc from the other substances in aqueous solution the solution must necessarily be highly fluid. This, however, is not essential to the process, since for the carrying out of the latter it is only necessary that there be sufficient water present to produce the required chemical reactions, and this may be effected by the use of a comparatively small quantity of water, if sufficient time is allowed. The mass in a plastic or even in a substantially dry condition or the oxid of zinc alone, separated from the other substances as above described may be treated in association with carbon in a retort for the distillation and recovery of the zinc in the usual way.

Free zinc that may occur in the skimmings in the form of "shot metal" or otherwise is recovered in the distillation.

What I claim as new, and desire to secure by Letters Patent, is—

1. The process of converting zinc compounds of zinc-skimmings into oxid of zinc, which consists in treating the zinc-skimmings with the oxid of an alkali or the oxid of an alkaline earth in the presence of moisture, substantially as described.

2. The process of converting zinc compounds of zinc-skimmings into oxid of zinc, which consists in treating the zinc-skimmings with oxid of calcium in the presence of moisture, substantially as described.

3. The process of converting zinc compounds of zinc-skimmings into oxid of zinc, which consists in treating the zinc-skimmings with the oxid of an alkali or the oxid of an alkaline earth in the presence of moisture, and applying heat to the mixture, substantially as described.

4. The process of converting zinc compounds of zinc-skimmings into oxid of zinc and separating the oxid of zinc from the mass, which consists in treating the zinc-skimmings with the oxid of an alkali or the oxid of an alkaline earth, with sufficient water to form an aqueous solution of the resulting soluble compounds, and thereafter drawing off the solution, leaving the insoluble oxid of zinc as a sediment, substantially as described.

HERMAN C. MEISTER.

In presence of—
OTTO F. MEISTER,
RICHARD HOSPES.